(12) United States Patent
Merritt et al.

(10) Patent No.: US 7,757,502 B2
(45) Date of Patent: Jul. 20, 2010

(54) RAM FAN SYSTEM FOR AN AIRCRAFT ENVIRONMENTAL CONTROL SYSTEM

(75) Inventors: Brent Merritt, Southwick, MA (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1225 days.

(21) Appl. No.: 11/103,847

(22) Filed: Apr. 12, 2005

(65) Prior Publication Data
US 2006/0059941 A1 Mar. 23, 2006

Related U.S. Application Data

(60) Provisional application No. 60/611,939, filed on Sep. 22, 2004.

(51) Int. Cl.
*F28B 9/00* (2006.01)
*F25D 9/00* (2006.01)

(52) U.S. Cl. .............................. 62/172; 62/402; 418/83; 417/405; 417/406; 454/71

(58) Field of Classification Search .................... 62/86, 62/401, 402, 413, 414, 132, 172; 310/60 R, 310/52, 53, 54; 417/405, 406; 454/71; 384/105, 384/106; 418/83, 84, 85
See application file for complete search history.

(56) References Cited

U.S. PATENT DOCUMENTS

| 2,192,089 | A | | 2/1940 | Long |
| 2,793,506 | A | * | 5/1957 | Moody ......................... 62/505 |
| 3,877,246 | A | * | 4/1975 | Schutze ........................ 62/402 |
| 3,878,692 | A | | 4/1975 | Steves |
| 4,005,228 | A | | 1/1977 | Norris |
| 4,312,191 | A | * | 1/1982 | Biagini ......................... 62/402 |
| 4,507,939 | A | * | 4/1985 | Wieland ....................... 62/402 |
| 4,901,523 | A | * | 2/1990 | Huelster ....................... 60/791 |
| 5,113,670 | A | * | 5/1992 | McAuliffe et al. ............. 62/402 |
| 5,125,597 | A | | 6/1992 | Coffinberry |
| 5,143,329 | A | | 9/1992 | Coffinberry |
| 5,214,935 | A | * | 6/1993 | Brunskill ...................... 62/402 |

(Continued)

FOREIGN PATENT DOCUMENTS

DE 10232100 2/2003

(Continued)

OTHER PUBLICATIONS

European Search report and written opinion mailed Nov. 11, 2008.

*Primary Examiner*—Ljiljana (Lil) V Ciric
(74) *Attorney, Agent, or Firm*—Carlson, Gaskey & Olds PC

(57) ABSTRACT

An environmental control system includes a RAM air fan system downstream of a respective heat exchanger in the relatively high temperature RAM exhaust. The RAM air fan includes a RAM air fan electric motor such that the RAM air fan is driven at a speed independent of an air cycle machine. A fan rotor is completely supported by hydrodynamic foil journal and thrust bearings. As the RAM air fan is driven by the RAM air fan electric motor the RAM air fan is installed in the environmental control system as a self-contained system.

5 Claims, 2 Drawing Sheets

U.S. PATENT DOCUMENTS

| | | | |
|---|---|---|---|
| 5,224,842 A * | 7/1993 | Dziorny et al. | 417/406 |
| 5,309,735 A * | 5/1994 | Maher et al. | 62/402 |
| 5,311,749 A * | 5/1994 | McAuliffe et al. | 62/402 |
| 5,529,398 A * | 6/1996 | Bosley | 384/105 |
| 5,605,045 A * | 2/1997 | Halimi et al. | 60/607 |
| 5,704,218 A | 1/1998 | Christians et al. | |
| 5,887,445 A * | 3/1999 | Murry et al. | 62/402 |
| 5,938,341 A * | 8/1999 | Eccles | 384/106 |
| 6,009,722 A * | 1/2000 | Choi et al. | 62/505 |
| 6,070,418 A * | 6/2000 | Crabtree et al. | 62/401 |
| 6,151,909 A * | 11/2000 | Carter et al. | 62/402 |
| 6,257,003 B1 | 7/2001 | Hipsky | |
| 6,305,156 B1 | 10/2001 | Lui | |
| 6,434,968 B2 * | 8/2002 | Buchholz et al. | 62/401 |
| 6,457,318 B1 | 10/2002 | Lui et al. | |
| 6,615,606 B2 | 9/2003 | Zywiak | |
| 6,639,328 B2 * | 10/2003 | Wacknov | 60/649 |
| 7,322,207 B2 * | 1/2008 | Kikuchi et al. | 62/401 |
| 7,402,020 B2 * | 7/2008 | Beers et al. | 415/1 |
| 7,497,627 B2 * | 3/2009 | Saville et al. | 384/105 |
| 7,633,193 B2 * | 12/2009 | Masoudipour et al. | 310/54 |
| 2004/0188360 A1 * | 9/2004 | Armstrong et al. | 210/774 |
| 2004/0261428 A1 | 12/2004 | Murry et al. | |

FOREIGN PATENT DOCUMENTS

| | | |
|---|---|---|
| EP | 1041289 | 4/2000 |
| JP | 2002070864 A * | 3/2002 |

* cited by examiner

RAM FAN SYSTEM FOR AN AIRCRAFT ENVIRONMENTAL CONTROL SYSTEM

REFERENCE TO RELATED APPLICATIONS

The present invention claims the benefit of U.S. Provisional Patent Application No. 60/611,939, filed Sep. 22, 2004.

BACKGROUND OF THE INVENTION

The present invention relates to environmental control systems (ECSs), and more particularly to an ECS ram air fan subsystem.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages. Interaction between the air and liquid subsystems is relatively complex. Moreover, airflow sequencing, particularly for multi-turbine air cycle machines (ACMs), radically affects ECS efficiency. In many instances much thermal energy may be wasted or otherwise inefficiently used.

In one conventional system, a flow of bleed air is taken from an intermediate or high pressure stage within a jet engine. The bleed air is pre-cooled within an air-to-air heat exchanger with heat being rejected to ram air and then flowed to a compressor of the ACM. After compression, the air is routed through a second air-to-air heat exchanger, a regenerative heat exchanger and an air-to-air reheater heat exchanger. Condensed water vapor is extracted by a water extractor, and dehumidified air is routed to a turbine. Expanded air from the turbine flows through another water collector and into a liquid-to-air heat exchanger of the liquid loop. A relatively warmer liquid in the liquid loop which is used to cool the avionics is thereby cooled. From the liquid-to-air heat exchanger, the air passes through the reheater heat exchanger. The dehumidified air is then passed into a second turbine of the ACM where it is again expanded and passed through another liquid-to-air heat exchanger to further absorb heat from the liquid loop.

Ram air fan subsystems operate when the ram airflow may not be sufficient to provide sufficient airflow over the air-to-air heat exchanger. Conventional air driven ram air fan subsystems utilize a fan rotor upstream of the air-to-air heat exchanger supported by conventional roller bearing elements and/or a fan rotor downstream of the air-to-air heat exchanger supported by air bearings. Operation of the ram air fan subsystem may generate some temperature rise across the air-to-air heat exchanger which reduces the efficiency thereof. This may reduce the efficiency of the entire ECS system.

Accordingly, it is desirable to provide an airflow sequence for an ECS system which more efficiently utilizes bleed air as a cooling medium and which minimizes the inefficiency of the ECS ram fan system.

SUMMARY OF THE INVENTION

The ECS system according to the present invention provides a ram air fan (RAF) system downstream of a respective heat exchanger in the relatively high temperature ram exhaust. The RAF includes an electric motor such that the RAF is driven at a speed independent of the ACM which reduces generated noise and increases overall operating efficiency. Furthermore, as the RAF is driven by the independent RAF electric motor the RAF is installed in the ECS system as a self contained system such as Line Replaceable Units (LRUs) which simplifies maintenance, improves reliability and performance while decreasing system weight.

The RAF generally includes a housing, the RAF electric motor, a fan rotor and a multiple of hydrodynamic foil journal and thrust bearings. The fan rotor is completely supported by the hydrodynamic foil journal and thrust bearings which permits effective operation of the RAF downstream of the respective heat exchangers in the relatively high temperature ram exhaust.

The present invention therefore provide an airflow sequence for an ECS system which more efficiently utilizes bleed air as a cooling medium and which minimizes the inefficiency of the ECS ram fan system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
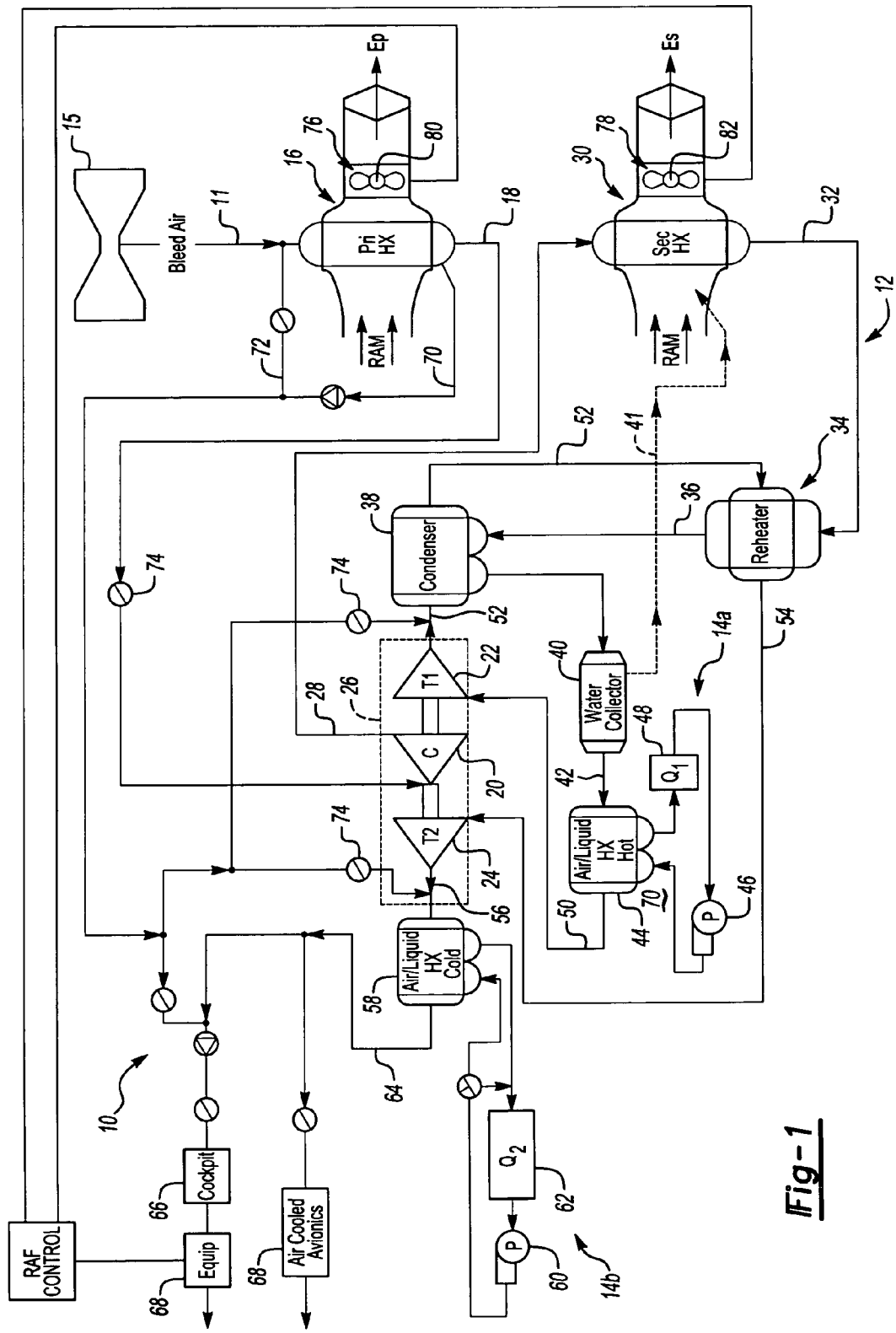
FIG. 1 is a schematic representation of environmental control system according to the present invention.

FIG. 1 illustrates a general schematic view of a liquid-to-air cycle system or environmental control system (ECS) 10. The ECS 10 includes an air cycle subsystem 12 that is in a heat exchange relationship with a liquid cycle subsystem 14a, 14b. It should be understood that although two separate liquid subsystems are disclosed in the illustrative embodiment, a single substantially continuous subsystem will also benefit from the present invention.

Bleed air 11 is preferably received from a gas turbine engine (illustrated schematically at 15). The bleed air 11 is sent through a primary heat exchanger 16 such that the bleed air 11 is in heat exchange relationship with ram or ambient air. The primary heat exchanger 16 is preferably an air-to-air exchanger. After the bleed air 11 is cooled in the primary heat exchanger 16, the resulting cooler air is communicated through a passage 18 which communicates with a compressor 20 where the air is compressed to a high pressure. The compressor 20 is preferably located upon a common shaft with a first turbine 22 and a second turbine 24. The compressor 20 and turbines 22, 24 define an air cycle machine (ACM) 26.

Compressed air exits the compressor 20 through a passage 28 which communicates with a secondary heat exchanger 30. The secondary heat exchanger 30 is preferably an air-to-air exchanger which further cools the compressed air by heat exchange with a ram air flow. Compressed, cooled and water vapor bearing air exits the secondary heat exchanger 30 and flows through a duct 32 which communicates with a reheater 34.

The reheater 34 further cools the water vapor bearing air which exits the reheater 34 through a passage 36. Passage 36 communicates with a condenser 38 which further cools the water vapor bearing air by condensing and separating the water into a water extractor 40. As the water vapor bearing air is passed directly from the reheater 34 to the condenser 38, the water from the water vapor condenses relatively easily.

Dehumidified air exits the extractor 40 and is communicated through a passage 42 to a first air-liquid heat exchanger 44. The first air-liquid heat exchanger 44 is part of the air cycle subsystem 12 and the liquid cycle subsystem 14a to form a heat exchange relationship therebetween. Moreover, moisture which may remain in the air is removed as the temperature of the air is increased by passage through the first air-liquid heat exchanger 44.

The liquid cycle subsystem 14a, is preferably a closed system and utilizes a liquid coolant, such as polyalphaolephin (PAO) which is cycled by a pump 46 or the like. The liquid coolant functions as a coolant medium for a heat load 48 and as a heat source for the dehumidified air which is passing through passage 42. The heat load 48 is typically an avionics subsystem which generates a rather large amount of heat—typically around 160 degrees Fahrenheit. The heat exchange process therein between the liquid coolant in the liquid cycle subsystem 14a and the air communicated through passage 42 cools the liquid removes heat from the load 48 and heats the air exiting the first air-liquid heat exchanger 44.

Dehumidified heated air exits the first air-liquid heat exchanger 44 through a passage 50 which communicates with the first turbine 22. The air is expanded through the first turbine of the ACM 26 between an inlet pressure of the first turbine 22 and an outlet pressure of the second turbine 24. The first turbine 22 also assists in condensing any water vapor which may still be in the air as a result of the air being expanded and thus cooled.

The recovered heat from the first air-liquid heat exchanger 44 is used by the first turbine 22, for example, to increase its rotating speed, boost its pressure ratio, increase its power and increase the expansion of the reheated air. Further, the first turbine 22 is mechanically engaged to the compressor 20 and the second turbine 24. Thus, heat or energy absorbed by the first turbine 22 is further converted to useful energy by the compressor 20.

The discharge pressure from the first turbine 22 is maintained at a discharge temperature just above freezing (mid-pressure) so that the first turbine 22 outlet air which passes through a passage 52 operates as a heat sink for the condenser 38 and the reheater 34. That Heated air exits the reheater 34 through a passage 54 which communicates with the second turbine 24. The recovered heat from the condenser 38 and the reheater 34 is used by the second turbine 24, for example, to increase its rotating speed, boost its pressure ratio, increase its power and increase the expansion of the reheated air. Thus, the performance of both turbines 22, 24 is improved from otherwise wasted energy. Moreover, the increased turbine cooling advantageously allows the minimization of size and/or weight of the heat exchangers.

The air is expanded through the second turbine 24 of the ACM 26. The discharge pressure from the second turbine 24 is preferably maintained at a discharge temperature just below freezing. The second turbine 24 outlet air passes through a passage 56 which communicates with a second air-liquid heat exchanger 58. The second air-liquid heat exchanger 58 forms part of the air cycle subsystem 12 and the liquid cycle subsystem 14b to form a heat exchange relationship therebetween.

The liquid cycle subsystem 14b, is preferably a closed system as described above. The liquid coolant of the liquid cycle subsystem 14b is cycled by a pump 60 and functions as a coolant medium for a second heat load 62. An operating temperature of the second heat load 62 is preferably lower than the operating temperature of the first heat load 48—typically around 75 degrees Fahrenheit—but also cools other downstream heat loads. It should be understood that the operating temperatures of the heat loads are representative and other operating temperatures will also be applicable to the present invention.

The heat exchange process therein between the liquid coolant in the liquid cycle subsystem 14b and the air communicated through passage 56 cools the liquid, removes heat from the load 62 and heats the air exiting the second air-liquid heat exchanger 58. The relatively warmer air exits second air-liquid heat exchanger 58 through a passage 64 which communicates with cockpit 66 and/or other air loads 68 to provide cooling air therefor.

In the event that it is desired to modulate the supply from the first turbine 22, second turbine 24, cockpit 66 and/or the air loads 68, a temperature control passage 70, 72 communicates directly with bleed air 11 prior and/or subsequent to the primary heat exchanger 16. Control valves 74 are preferably located just downstream of the first turbine 22 and the second turbine 24, and just upstream of the cockpit 66 and/or the air loads 68 to allow warm air mixture therewith. Operation of such control valves may be implemented by a microprocessor based electronic control system (either digital or analog; not shown).

The primary heat exchanger 16 and the secondary heat exchanger 30 preferably include a respective primary ram air fan (RAF) system 76 and a secondary ram air fan (RAF) system 78. Notably, the RAFs 76,78 are located downstream of the respective heat exchangers 16, 30 in the ram exhaust (illustrated schematically by arrows Ep, Es) such that temperature rise across the RAFs 76, 78 will not effect ECS performance. Each RAF 76, 78 includes an electric motor 80,82 such that each RAF 76, 78 is driven at a speed independent of the ACM 26 which reduces generated noise and increases overall operating efficiency. Furthermore, as each RAF 76, 78 is driven by the independent RAF electric motors 80, 82 the RAF 76, 78 are preferably installed in the ECS systems 10 as self contained systems such as Line Replaceable Units (LRUs) which simplifies maintenance, improves reliability and performance while decreasing system weight.

Figure 2:
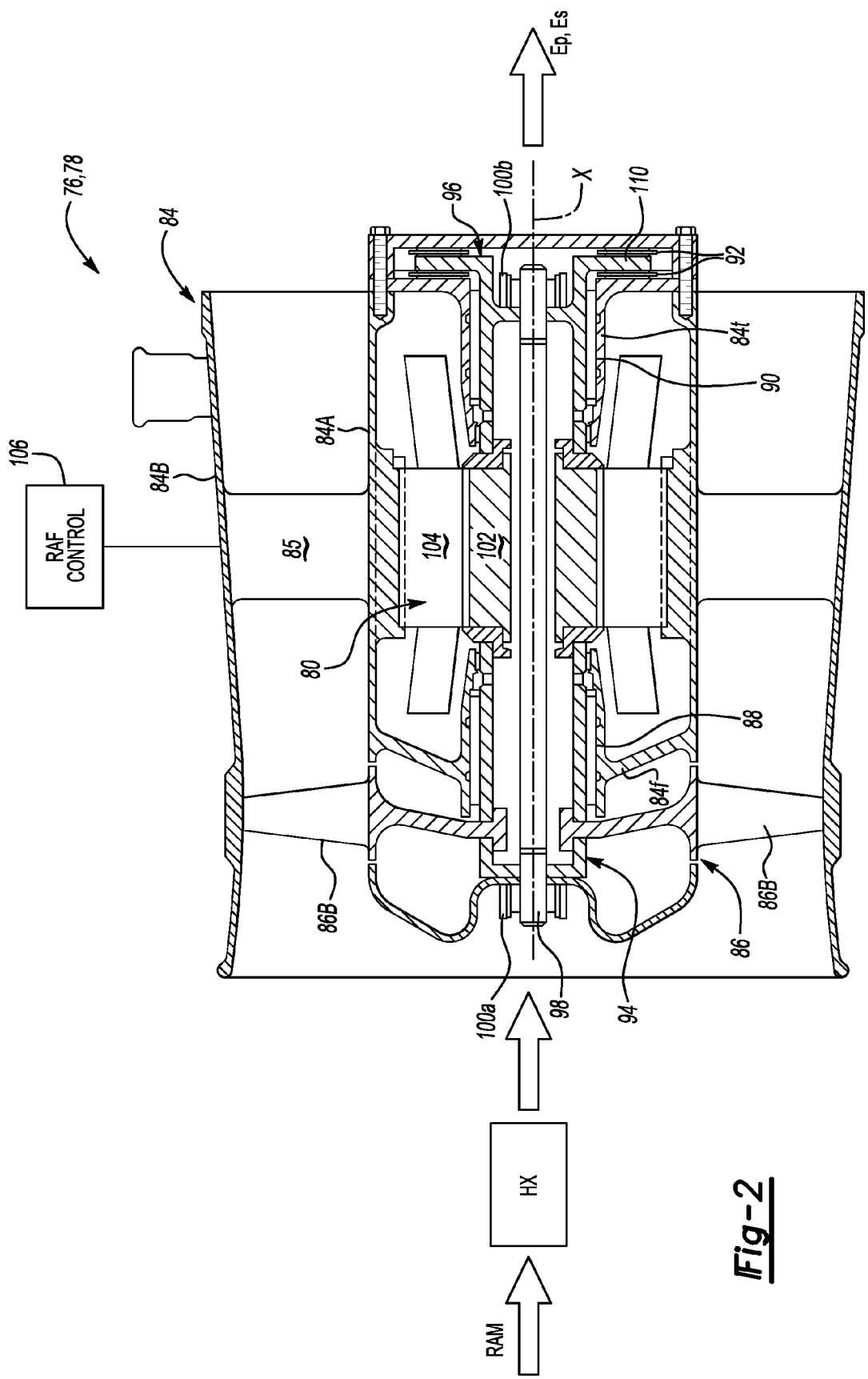
FIG. 2 is a sectional view of a ram air fan.

Referring to FIG. 2, one of the RAFs 76, 78 are illustrated in cross-section along the RAF 76, 78 rotational axis X. Although RAF 76 will be described with reference to FIG. 2, it should be understood that RAF 78 as well as other heat exchanger fan systems will also benefit from the present invention. The RAF 76 generally includes a housing 84, the RAF electric motor 80, a fan rotor 86 and a multiple of hydrodynamic foil journal and thrust bearings 88, 90, and 92.

The fan rotor 86 is mounted to a fan shaft 94 mounted for rotation about the axis or rotation X by the RAF electric motor 80. The fan rotor 86 drives a multiple of fan blades 86B which extend beyond the radial dimension of the RAF electric motor 80. The multiple of fan blades 86B extend radially outward of an inner housing portion 84A toward an outer housing portion 84B. A multiple of fixed struts 85 extend between the inner housing portion 84A and the outer housing portion 84B. The fan shaft 94 is preferably linked to a thrust shaft 96 by a tie rod 98. A fastener 100a, 100b on each end segment of the tie rod 98 secures the fan shaft 94 and the thrust shaft 96 to axially position and rotationally connect the fan rotor 86 and the RAF electric motor 80. The RAF electric motor 80 includes a rotor 102 mounted between the fan shaft 94 and the thrust shaft 96. The rotor 102 is rotationally mounted within a stator 104 mounted to the housing 84. The RAF electric motor is preferably driven in response to a RAF controller 106 (illustrated schematically). The RAF controller 106 drives the RAF 76 independently of the ACM 26 (FIG. 1).

One hydrodynamic foil journal bearing 88 is located between the fan shaft 94 and a fan housing portion 84f of the housing 84. A second hydrodynamic foil journal bearing 90 is located between the thrust shaft 96 and a thrust shaft housing portion 84T of the housing 84. The hydrodynamic foil thrust bearing 92 is located between a radially extending thrust shaft flange portion 110 and the housing 84. The fan rotor 86 is completely supported by the hydrodynamic foil journal and thrust bearings 88, 90, 92 which permits effective operation of the RAFs 76,78 downstream of the respective heat exchangers 16, 30 in the relatively high temperature RAM exhaust (illustrated schematically by arrows Ep, Es).

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An environmental control system including an air cycle machine system comprising:
    a heat exchanger;
    a ram air fan rotor downstream of said heat exchanger;
    a fan housing;
    a fan shaft mounted along an axis of rotation, said ram air fan rotor mounted to said fan shaft;
    a thrust shaft mounted along said axis of rotation;
    a hydrodynamic foil journal bearing which supports said fan shaft for rotation about said axis or rotation;
    an electric motor stator mounted within said fan housing;
    an electric motor rotor mounted between said fan shaft and said thrust shaft, said electric motor rotor mounted within said electric motor stator to drive said fan shaft and said thrust shaft about said axis of rotation and,
    a ram fan controller for driving said electric motor rotor independently of the air cycle machine.

2. The environmental control system system as recited in claim 1, further comprising a tie rod interconnecting said fan shaft and said thrust shaft.

3. The environmental control system system as recited in claim 2, further comprising a first fastener to retain said fan shaft to said tie rod and a second fastener to axially retain said thrust shaft to said tie rod.

4. The environmental control system system as recited in claim 2, further comprising a hydrodynamic foil journal bearing which supports said thrust shaft.

5. The environmental control system system as recited in claim 4, further comprising a hydrodynamic foil thrust bearing between a radial flange which extends from said thrust shaft and said housing.

* * * * *